US006991828B2

(12) United States Patent
Husemann et al.

(10) Patent No.: US 6,991,828 B2
(45) Date of Patent: Jan. 31, 2006

(54) USE OF MACROMONOMERS TO PREPARE ACRYLIC PSAS

(75) Inventors: Marc Husemann, Hamburg (DE); Stephan Zöllner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 107 days.

(21) Appl. No.: 10/430,150

(22) Filed: May 6, 2003

(65) Prior Publication Data

US 2004/0010088 A1 Jan. 15, 2004

(30) Foreign Application Priority Data

May 11, 2002 (DE) ................................ 102 21 093

(51) Int. Cl.
*B05D 5/10* (2006.01)
(52) U.S. Cl. ................... 427/208.4; 156/332; 525/301; 525/309; 526/931
(58) Field of Classification Search ................ 525/301, 525/309; 427/208.4; 156/332; 526/931
See application file for complete search history.

(56) References Cited

U.S. PATENT DOCUMENTS

| 3,786,116 A | 1/1974 | Milkovich et al. .......... 260/885 |
| 4,551,388 A | 11/1985 | Schlademan ................ 428/355 |
| 4,554,324 A | 11/1985 | Husman et al. ............. 525/301 |
| 4,581,429 A | 4/1986 | Solomon et al. ............ 526/220 |
| 5,767,210 A | 6/1998 | Lecomte et al. ............ 526/166 |
| 5,789,487 A | 8/1998 | Matyjaszewski et al. ... 525/301 |
| 5,811,500 A | 9/1998 | Dubois et al. .............. 526/145 |
| 5,854,364 A | 12/1998 | Senninger et al. .......... 526/192 |
| 5,866,249 A | 2/1999 | Yarusso et al. ............. 428/355 |
| 5,919,871 A | 7/1999 | Nicol et al. ............... 525/333.8 |
| 5,945,491 A | 8/1999 | Matyjaszewski et al. ... 526/111 |
| 6,114,482 A | 9/2000 | Senninger et al. .......... 526/172 |
| 6,479,608 B1 | 11/2002 | Nesvadba et al. ....... 526/328.5 |
| 2003/0114582 A1 | 6/2003 | Husemann et al. |

FOREIGN PATENT DOCUMENTS

| DE | 199 49 352 A1 | 4/2000 |
| DE | 100 34 069 A1 | 2/2002 |
| DE | 100 52 955 A1 | 6/2002 |
| EP | 0 735 052 A2 | 10/1996 |
| EP | 0 824 110 A1 | 2/1998 |
| EP | 0 824 111 A1 | 2/1998 |
| EP | 0 826 698 A1 | 3/1998 |
| EP | 0 841 346 A1 | 5/1998 |
| EP | 0 850 957 A1 | 7/1998 |
| EP | 1 312 658 A2 | 5/2003 |
| WO | WO 96/24620 | 8/1996 |
| WO | WO 98/13392 | 4/1998 |
| WO | WO 98/44008 | 10/1998 |
| WO | WO 02/02709 A1 | 1/2002 |

OTHER PUBLICATIONS

U.S. Appl. No. 10/312,124 (corresponding to DE 100 34 069).
U.S. Appl. No. 10/312,124, Husemann et al, filed May 12, 2003.

*Primary Examiner*—Fred Teskin
(74) *Attorney, Agent, or Firm*—Norris McLaughlin & Marcus PA

(57) ABSTRACT

The use of macromonomers which
  have a glass transition temperature of at least 20° C.,
  have at least one oligomeric and/or polymeric structural unit which is incompatible with polyacrylates, and
  have at least one polymerizable double bond in the form of a vinyl, acrylate and/or methacrylate unit
as comonomers in the preparation of oriented polyacrylate pressure sensitive adhesives.

12 Claims, No Drawings

USE OF MACROMONOMERS TO PREPARE ACRYLIC PSAS

The invention relates to the use of certain macromonomers as comonomers in the preparation of oriented polyacrylate pressure sensitive adhesives (PSAs).

BACKGROUND OF THE INVENTION

As a result of ever-increasing environmental obligations and cost pressure, there is at present a trend toward preparing PSAs with little if any solvent. This objective can most easily be realized by means of the hotmelt technology. A further advantage is the reduction in production time: hotmelt lines can laminate adhesives much more quickly to carriers or release paper, and so can save time and money.

However, the hotmelt technology always imposes stringent requirements on the adhesives. For high-grade industrial applications, particular preference is given to polyacrylates, on account of their transparency and stability to weathering.

In order to prepare acrylic hotmelts, conventionally, acrylate monomers are polymerized in solution and the solvent is then removed in the extruder in a concentration process.

For producing compositions of very high shear strength it is very common to polymerize macromonomers, which raise the internal cohesion of the PSA by means, for example, of phase separation. For example, macromonomers were polymerized for the first time in U.S. Pat. No. 3,786,116.

U.S. Pat. No. 4,551,388 describes polystyrenes which are terminated with a methacrylate function and are polymerized with various acrylate comonomers. These polymers are used as PSAs. A short time later, macromonomers of this kind were commercialized by Sartomer and sold under the trade name Chemlink® 4500. In the technical bullentin from Sartomer, for example the copolymerization of Chemlink® 4500 with various acrylate monomers to prepare acrylic hotmelt PSAs was recommended as far back as 1984. In U.S. Pat. No. 4,554,324 these macromonomers were used to prepare high-shear-strength acrylic PSAs.

A further important property for the coating of acrylate compositions from the melt is the phenomenon of orientation of the polymer chains, especially for polyacrylates of relatively high molecular mass. As a result of the orientation the polymers in question may have particular properties, which are generally manifested in at least planar anisotropy of the properties.

Some general examples of properties which can be influenced by the degree of orientation in the polymers and/or in the plastics produced from them are their strength or stiffness, thermal conductivity, thermal stability, and anisotropy in respect of permeability to gases and liquids (cf., for example, I. M. Ward, Structure and Properties of Oriented Polymers, $2^{nd}$ ed. 1997, Kluwer, Dortrecht).

The abovementioned orientation of the macromolecules likewise plays an important part for the properties of PSAs that are relevant to their adhesion; for instance, interesting properties have likewise been found for oriented PSAs.

The generation of a partial orientation in partially crystalline, rubber-based PSAs was described back in U.S. Pat. No. 5,866,249. As a result of the anisotropic adhesion properties it was possible to define innovative PSA applications.

DE 100 34 069.5 describes a method of orienting acrylic hotmelts in which the acrylic PSAs described were crosslinked with actinic radiation on a roller shortly after having been coated from the die.

DE 100 52 955.0 described an application-specific advantage of these oriented acrylic hotmelts. There it was found that oriented acrylic hotmelts, in the form of PSA tapes, possess in particular improved diecutting properties.

A disadvantage in these methods described above is that the orientation slowly decreases over a prolonged period of time, as a result of structural relaxation.

It is an object of the invention, therefore, to provide oriented acrylic pressure sensitive adhesives in which the orientation is maintained over a prolonged period, and which thus do not have the disadvantage of structural relaxation, or have it only to a reduced extent, while not losing the application-relevant advantages of acrylic PSAs. A further object is to provide a process for preparing such oriented pressure sensitive adhesives.

SUMMARY OF THE INVENTION

This object is unforeseeably achieved, during the polymerization of acrylic pressure sensitive adhesives, by adding macromonomers to the monomer mixture to be polymerized, said macromonomers possessing not only a polymerizable structural unit but also a structural unit which is incompatible with the polyacrylate, and using polymers prepared in this way for the preparation of oriented PSAs. This procedure leads surprisingly to the result that the orientation of the PSA is retained for a longer time.

The invention accordingly provides for the use of macromonomers which
  have a glass transition temperature of at least 20° C.,
  have at least one oligomeric and/or polymeric structural unit which is incompatible with polyacrylates, and
  have at least one polymerizable double bond in the form of a vinyl, acrylate and/or methacrylate unit as comonomers in the preparation of oriented polyacrylate pressure sensitive adhesives.

DETAILED DESCRIPTION

The polymerizable double bond should be amenable in particular to a free-radical and/or an anionic polymerization.

The incompatibility with ("conventional") polyacrylates is manifested in the failure of the radical formed by the oligomeric or polymeric structural unit to mix with the polyacrylate composition (i.e., with the polyacrylate or polymethacrylate main chains), so that—much like the hydrophobic ends of amphiphilic compounds during the formation of micelles in an aqueous environment—the phenomenon of phase separation, in particular of microphase separation, is developed.

Without the addition of the monomers used in accordance with the invention to the monomer mixture to be polymerized, a polyacrylate composition prepared in this way ought preferably to be in a homogeneous form.

For the microphase separation, the oligomeric and/or polymeric radicals ought not to be incorporated into the polyarylate composition by polymerization. A preferred approach is therefore for the oligomeric or polymeric structural unit to be inert (under conventional polymerization conditions, i.e., without drastic reaction parameters) to a radical polymerization. In a further advantageous approach, the oligomeric or polymeric structural unit is inert (under conventional reaction conditions) to an anionic reaction; the oligomeric or polymeric structural unit may also be chosen such that it is amenable neither to a radical nor to an anionic polymerization.

The orientation of the PSA can be quantified advantageously by way of its refractive index. The oriented polyacrylate PSAs advantageously have a preferential direction such that the refractive index measured in the preferential direction, $n_{MD}$, is greater than the refractive index measured in a direction perpendicular to the preferential direction, $n_{CD}$, with the difference $\Delta n = n_{MD} - n_{CD}$ being preferably at least $1 \cdot 10^{-6}$.

The refractive indices are measured in accordance with the method described in Test B, version 2.

In addition to measuring the orientation by determining the $\Delta n$ value (see Test B) it is likewise suitable to consider the shrinkback behavior (determination of the shrinkback) of the PSAs in the free film in order to quantify the orientation and the anisotropic properties.

Immediately following their preparation, the oriented PSAs preferably display a shrinkback behavior of at least 3% of the free film, determined in accordance with Test D. To this end the PSAs are crosslinked, processed and measured immediately (preferably within a period <5 minutes) after they have been applied by coating.

The desire is for long-lasting retention of the orientation. Advantageously, 3 months after their preparation, with storage during that time at 23° C. and 50% relative humidity, the oriented PSAs exhibit a shrinkback of at least 3% in the free film, determined in accordance with Test D.

For this measurement the PSAs are coated onto release paper and are stored in this state under the conditions specified above for 3 months. After 3 months, the PSAs are processed and subjected to measurement as described in Test D.

In a very advantageous version of their use in accordance with the invention, the resultant PSAs have a shrinkback, as measured directly after coating, of at least 5%, more preferably at least 10%, more preferably still at least 25%.

In accordance with their inventive use, the shrinkback behavior of the PSAs, after a period of three months following their preparation, exhibit even more advantageously a shrinkback of at least 5%, more preferably at least 10%, more preferably still at least 25%.

The monomer mixture to be polymerized is advantageously chosen such that the resulting polymers can be used as pressure sensitive adhesives at room temperature or higher temperatures, particularly such that the resulting polymers possess pressure sensitive adhesion properties in accordance with the "Handbook of Pressure Sensitive Adhesive Technology" by Donatas Satas (van Nostrand, New York 1989).

Very preferably it is possible to choose a monomer composition as follows:
(A) acrylic esters and/or methacrylic esters of the general formula $CH_2=CH(R^1)(COOR^2)$, $R^1$ being chosen to be H and/or $CH_3$ and $R^2$ being chosen to be a linear, branched, cyclic or polycyclic alkyl radical having preferably from 1 to 20 carbon atoms,
(B) macromonomers in accordance with the main claim, i.e., macromonomers which
   have a glass transition temperature of at least 20° C.,
   have a least one oligomeric and/or polymeric structural unit which is incompatible with polyacrylates, and
   have at least one polymerizable double bond in the form of a vinyl, acrylate and/or methacrylate unit,
(C) if desired, futher functional monomers which possess at least one vinyl, acrylate and/or methacrylate group.

It is particularly advantageous to use the following weight fractions, based on the overall monomer mixture:

30 to 98% by weight of (A), 2 to 40% by weight of (B), up to 30% by weight of (C), the composition being chosen such that the weight fractions add up to 100% by weight or to a smaller figure, further monomers being added in the second case.

The composition and the percentage fraction of the macromonomers (B) are chosen such that, following copolymerization with (A) and, optionally, (C), a microphase separation occurs in which preferably, as a result of the polymeric units of the macromonomers (B), domains are formed which have a static glass transition temperature of more than 20° C., the static glass transition temperature of the polyacrylate main chain being preferably less than 10° C. It is advantageous here for one polymer chain to contain on average from 1.5 to 2.5 side chains based on copolymerized macromonomers.

A pressure sensitive adhesive which is preferably advantageous in terms of the use according to the invention is one obtainable by radical or anionic polymerization and comprising a polymer based on a polymer mixture of at least the following components: acrylic esters and/or methacrylic esters at from 30 to 98% by weight as monomers of group (A); vinyl-, acrylate- or methacrylate-terminated macromonomers having a glass transition temperature of at least 20° C. at from 2 to 40% by weight as monomers of group (B); and functional monomers having at least one vinyl, acrylate or methacrylate group and up to 30% by weight of monomers of group (C), all percentages by weight being based on the monomer mixture, the pressure sensitive adhesive exhibiting microphase separation and a preferential direction, quantified by way of the shrinkback behavior of the pressure sensitive adhesive in accordance with Test D, which directly after coating is at least 3% and which still possesses a value of at least 3% even after three months.

Monomers of group (A) to be used with advantage are, for example, acrylic and/or methacrylic esters with alkyl radicals of 4 to 14 carbon atoms, preferably 4 to 9 carbon atoms. Specific examples that may be mentioned, without wishing to be unnecessarily restricted thereby, include the following: methyl acrylate, ethyl acrylate, n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, the corresponding methacrylates, in each case the branched isomers of the acrylates and/or methacrylates, such as isobutyl acrylate, 2-ethylhexyl acrylate, 2-ethylhexyl methacrylate, isooctyl acrylate, and isooctyl methacrylate.

Further classes of compound which can be used for group (A) include monofunctional acrylates and/or methacrylates of bridged cycloalcohols, advantageously composed of at least 6 carbon atoms. The cycloalcohols may be substituted, by C1 to C6 alkyl groups, halogens or cyano groups, for example. Specific examples include cyclohexyl methacrylate, isobornyl acrylate, isobornyl methacrylate, and 3,5-dimethyladamantyl acrylate.

For the group of the macromonomers (B), monomers are used which have a static glass transition temperature of more than 20° C. and are not miscible with conventional poly(meth)acrylates.

The macromonomer is preferably composed of at least one oligomeric or polymeric structural unit which under the conditions of a normal copolymerization reaction behaves inertly with respect to this reaction, and of at least one vinyl, acrylate or methacrylate unit which is copolymerized with the monomers (A) and, optionally, (C).

The average molecular weight of the oligomeric or polymeric unit is preferably between 2000 and 40 000 g/mol. The oligomeric and polymeric units may be composed of homopolymers or copolymers.

Examples of compounds on which the oligomeric or polymeric unit of the macromonomers (B) is preferably based (monomers which serve preferably for preparing the oligomeric or polymer unit) are tert-butyl acrylate, isobornyl acrylate, adamantyl acrylate, tert-butyl methacrylate, isobornyl methacrylate, adamantyl methacrylate, methyl methacrylate, ethyl methacrylate, propyl methacrylate, isopropyl methacrylate, n-butyl methacrylate, styrene, α-methylstyrene, acrylic acid, 4-vinylpyridine, N-vinylphthalimide, 3,4-dimethoxystyrene, 4-vinylbenzoic acid, benzyl acrylate, benzyl methacrylate, phenyl acrylate, phenyl methacrylate, t-butylphenyl acrylate, t-butylphenyl methacrylate, 4-biphenyl acrylate and 4-biphenyl methacrylate, 2-naphthyl acrylate and 2-naphthyl methacrylate, and cyclohexyl methacrylate. This listing should not be considered to be conclusive.

Further suitable monomers can be found, for example, in the Handbook of Polymers, CRC Series.

In one embodiment which is very preferable for the purposes of the invention, the macro-monomers (B) used comprise polystyrene-, poly-α-methylstyrene-, and poly-methacrylate-terminated polymers which additionally possess acrylate or methacrylate groups. The average molecular weight of these compounds is preferably between 5000 and 30 000 g/mol.

Macromonomers of this kind may be chosen advantageously, for instance, in the sense of the molecules (specified in analogy to U.S. Pat. No. 4,551,388) of the general type

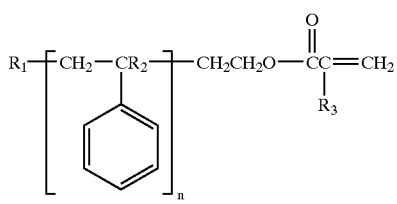

where $R_2$ is H or $CH_3$, n is 20 to 350 and $R_1$ is a radical which is a residue of the polymerization initiator, preferably, for example,

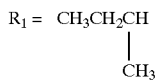

Macromonomers of this kind are sold commercially, for example, under the trade name Chemlink® 4500 (Sartomer) [$R_1$=$CH_3CH_2CH(CH_3)$; $R_2$=$CH_3$] or Methacromer® PS12 (Polymer Chemistry Innovations) [$R_1$ unspecified, $R_2$=$CH_3$].

In one preferred version, use is made of monomers (C) which carry polar groups such as carboxylic, sulfonic and phosphonic acid, hydroxyl, lactam and lactone, N-substituted amide, N-substituted amine, carbamate, epoxy, thiol, ether, alkoxy, and cyano or the like.

Examples, in the sense of a nonexhaustive list, of moderate basic monomers (C) are N,N-dialkyl-substituted amides, such as N,N-dimethylacrylamide, N,N-dimethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(butoxymethyl)methacrylamide, N-methylolacrylamide, N-(ethoxymethyl)acrylamide, and N-isopropylacrylamide.

Further preferred examples are hydroxyethyl acrylate, hydroxypropyl acrylate, hydroxyethyl methacrylate, hydroxypropyl methacrylate, allyl alcohol, maleic anhydride, itaconic anhydride, itaconic acid, glyceridyl methacrylate, phenoxyethyl acrylate, phenoxyethyl methacrylate, 2-butoxyethyl methacrylate, 2-butoxyethyl acrylate, cyanoethyl methacrylate, cyanoethyl acrylate, glyceryl methacrylate, 6-hydroxyhexyl methacrylate, vinylacetic acid, tetrahydrofurfuryl acrylate, β-acryloyloxypropionic acid, trichloroacrylic acid, fumaric acid, crotonic acid, aconitic acid, and dimethylacrylic acid.

In another very preferred version, monomers (C) used include vinyl esters, vinyl ethers, vinyl halides, vinylidene halides, and vinyl compounds with aromatic rings and heterocycles in the α position. Here again, mention may be made nonexclusively of some examples: vinyl acetate, vinylformamide, vinylpyridine, ethyl vinyl ether, vinyl chloride, vinylidene chloride, and acrylonitrile.

In a further version, comonomers additional to the comonomers (C) described are use which possess a static glass transition temperature of more than 20° C. but which do not cause the static glass transition temperature of the polyacrylate main chain to rise to more than 10° C.

Suitable components include aromatic vinyl compounds, such as styrene, in which case the aromatic nuclei are preferably composed of $C_4$ to $C_{18}$ units and may also contain heteroatoms. Particularly preferred examples include 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, t-butylphenyl acrylate, t-butylphenyl methacrylate, 4-biphenyl acrylate and methacrylate, 2-naphthyl acrylate and methacrylate, and mixtures of such monomers.

In another very preferred version, copolymerizable UV photoinitiators containing a copolymerizable double bond are used. The photoinitiators initiate and/or assist crosslinking of the PSAs on exposure to actinic radiation, and may be chosen in accordance with the monomers (B), the monomers (C) and/or other monomer groups. Suitable photoinitiators include Norrish I and Norrish II photoinitiators. Examples are benzoin acrylate and acrylated benzophenone (e.g. Ebecryl P 36® from UCB).

In principle it is possible to copolymerize any photoinitiator which is known to the skilled worker and which is able to crosslink the polymer by a free-radical mechanism under UV irradiation. An overview of possible photoinitiators which can be used and which can be functionalized with a double bond is given in Fouassier: "Photoinitiation, Photopolymerization and Photocuring: Fundamentals and Applications", Hanser-Verlag, Munich 1995. For further details, recourse may be made to Carroy et al. in "Chemistry and Technology of UV and EB Formulation for Coatings, Inks and Paints", Oldring (Ed.), 1994, SITA, London.

In order to prepare the poly(meth)acrylate PSAs it is advantageous to carry out conventional radical polymerizations. For the polymerizations proceeding by a radical mechanism it is preferred to use initiator systems which additionally comprise further radical initiators for the polymerization, especially thermally decomposing, radical-forming azo or peroxo initiators. In principle, however, any customary initiators that are familiar to the skilled worker for acrylates are suitable. The production of C-centered radicals is described in Houben Weyl, Methoden der Organischen Chemie, Vol. E 19a, pp. 60–147. These methods are employed preferentially in analogy.

Examples of radical sources are peroxides, hydroperoxides, and azo compounds; some nonexclusive examples of typical radical initiators that may be mentioned here include potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, and benzpinacol. In one very preferred version, 1,1'-azobis (cyclohexanecarbonitrile) (Vazo 88™ from DuPont) or azodiisobutyronitrile (AIBN) is used as radical initiator.

The average molecular weights $M_w$ of the pressure sensitive adhesives formed in the course of the radical polymerization are very preferably chosen such as to be situated within a range from 200 000 to 4 000 000 g/mol; specifically for further use as hotmelt pressure sensitive adhesives, PSAs having average molecular weights $M_w$ of from 600 000 to 800 000 g/mol are prepared. The average molecular weight is determined by size exclusion chromatography (GPC) or matrix-assisted laser desorption/ionization mass spectrometry (MALDI-MS).

The polymerization may be carried out in bulk, in the presence of one or more organic solvents, in the presence of water, or in mixtures of organic solvents and water. The aim is to minimize the amount of solvent used. Suitable organic solvents are pure alkanes (e.g., hexane, heptane, octane, isooctane), aromatic hydrocarbons (e.g., benzene, toluene, xylene), esters (e.g., ethyl, propyl, butyl or hexyl acetate), halogenated hydrocarbons (e.g., chlorobenzene), alkanols (e.g., methanol, ethanol, ethylene glycol, ethylene glycol monomethyl ether), and ethers (e.g., diethyl ether, dibutyl ether) or mixtures thereof. A water-miscible or hydrophilic cosolvent may be added to the aqueous polymerization reactions in order to ensure that in the course of monomer conversion the reaction mixture is in the form of a homogeneous phase. Cosolvents which can be used with advantage for the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxy ether derivatives, amino alcohols, ketones, and the like, and also derivatives and mixtures thereof.

The polymerization time is between 4 and 72 hours, depending on conversion and temperature. The higher the reaction temperature can be chosen, i.e., the higher the thermal stability of the reaction mixture, the lower the reaction time that can be chosen.

For the initiators which undergo thermal decomposition, the introduction of heat is essential to initiate the polymerization. For the thermally decomposing initiators the polymerization can be initiated by heating to from 50 to 160° C., depending on the initiator type.

In order to prepare polyacrylate PSAs having a narrow molecular weight distribution, controlled radical polymerization methods are also suitable. For the polymerization it is then preferred to use a control reagent of the general formula:

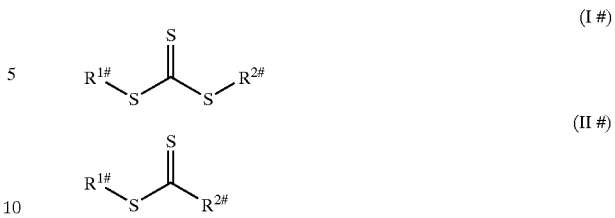

in which $R^{1\#}$ and $R^{2\#}$, chosen independently of one another or identical, are branched and unbranched $C_1$ to $C_{18}$ alkyl radicals; $C_3$ to $C_{18}$ alkenyl radicals; $C_3$ to $C_{18}$ alkynyl radicals;

$C_1$ to $C_{18}$ alkoxy radicals;

$C_3$ to $C_{18}$ alkynyl radicals; $C_3$ to $C_{18}$ alkenyl radicals; $C_1$ to $C_{18}$ alkyl radicals substituted by at least one OH group or a halogen atom or a silyl ether;

$C_2$ to $C_{18}$ heteroalkyl radicals having at least one oxygen atom and/or one NR* group in the carbon chain, R* representing any (especially organic) radical;

$C_3$ to $C_{18}$ alkynyl radicals, $C_3$ to $C_{18}$ alkenyl radicals, $C_1$ to $C_{18}$ alkyl radicals substituted by at least one ester group, amine group, carbonate group, cyano group, isocyanato group and/or epoxide group and/or by sulfur;

$C_3$ to $C_{12}$ cycloalkyl radicals;

$C_6$ to $C_{18}$ aryl or benzyl radicals;

hydrogen.

Control reagents of type (I #) are composed preferably of further-restricted compounds, as follows:

Halogen atoms therein are preferably F, Cl, Br or I, more preferably Cl and Br. As alkyl, alkenyl, and alkynyl radicals in the various substituents, both linear and branched chains are outstandingly suitable.

Examples of alkyl radicals containing from 1 to 18 carbon atoms are methyl, ethyl, propyl, isopropyl, butyl, isobutyl, t-butyl, pentyl, 2-pentyl, hexyl, heptyl, octyl, 2-ethylhexyl, t-octyl, nonyl, decyl, undecyl, tridecyl, tetradecyl, hexadecyl, and octadecyl.

Examples of alkenyl radicals having from 3 to 18 carbon atoms are propenyl, 2-butenyl, 3-butenyl, isobutenyl, n-2, 4-pentadienyl, 3-methyl-2-butenyl, n-2-octenyl, n-2-dodecenyl, isododecenyl, and oleyl.

Examples of alkynyl having from 3 to 18 carbon atoms are propynyl, 2-butynyl, 3-butynyl, n-2-octynyl, and n-2-octadecynyl.

Examples of hydroxy-substituted alkyl radicals are hydroxypropyl, hydroxybutyl, and hydroxyhexyl.

Examples of halogen-substituted alkyl radicals are dichlorobutyl, monobromobutyl, and trichlorohexyl.

A suitable $C_2$–$C_{18}$ heteroalkyl radical having at least one oxygen atom in the carbon chain is, for example, —$CH_2$—$CH_2$—O—$CH_2$—$CH_3$.

Examples of $C_3$–$C_{12}$ cycloalkyl radicals include cyclopropyl, cyclopentyl, cyclohexyl, and trimethylcyclohexyl.

Examples of $C_6$–$C_{18}$ aryl radicals include phenyl, naphthyl, benzyl, 4-tert-butylbenzyl or further substituted phenyl, such as ethylbenzene, toluene, xylene, mesitylene, isopropylbenzene, dichlorobenzene or bromotoluene.

The above listings serve only as examples of the respective groups of compounds, and make no claim to completeness.

Moreover, compounds of the following types may also be used as control reagents

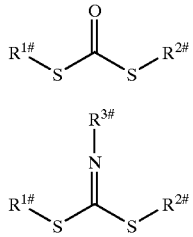

where $R^{3\#}$ likewise may be chosen independently of $R^{1\#}$ and $R^{2\#}$ from the above-recited group for these radicals.

In the case of the conventional "RAFT" process, polymerization is normally carried out only to low conversions (WO 98/01478 A1) in order to obtain very narrow molecular weight distributions. As a result of the low conversions, however, these polymers cannot be used as PSAs and in particular not as hotmelt PSAs, since the high fraction of residual monomers adversely affects the technical adhesive properties; the residual monomers would contaminate the solvent recyclate in the concentration process and the corresponding self-adhesive tapes would exhibit very high outgassing behavior. In order to circumvent this drawback of low conversions, in one particularly preferred procedure the polymerization is initiated a number of times.

As a further controlled radical polymerization method it is possible to carry out nitroxide-controlled polymerizations. In an advantageous procedure, radical stabilization is effected using nitroxides of type (V #) or (VI #):

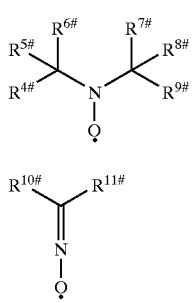

where $R^{4\#}, R^{5\#}, R^{6\#}, R^{7\#}, R^{8\#}, R^{9\#}, R^{10\#}, R^{11\#}$ independently of one another denote the following compounds or atoms:
i) halides, such as chlorine, bromine or iodine,
ii) linear, branched, cyclic, and heterocyclic hydrocarbons having from 1 to 20 carbon atoms, which may be saturated, unsaturated or aromatic,
iii) esters —COOR$^{12\#}$, alkoxides —OR$^{13\#}$ and/or phosphonates —PO(OR$^{14\#}$)$_2$, where $R^{12\#}, R^{13\#}$, and $R^{14\#}$ stand for radicals from group ii).

Compounds of structure (V#) or (VI#) may also be attached to polymer chains of any kind (primarily in the sense that at least one of the abovementioned radicals constitutes a polymer chain of this kind).

With more preference, controlled regulators which can be chosen from the following list are used for the polymerization:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl N-tert-butyl 1-phenyl-2-methylpropyl nitroxide
N-tert-butyl 1-(2-naphthyl)-2-methylpropyl nitroxide
N-tert-butyl 1-diethylphosphono-2,2-dimethylpropyl nitroxide
N-tert-butyl 1-dibenzylphosphono-2,2-dimethylpropyl nitroxide
N-(1-phenyl-2-methylpropyl) 1-diethylphosphono-1-methylethyl nitroxide
di-t-butyl nitroxide
diphenyl nitroxide
t-butyl t-amyl nitroxide.

U.S. Pat. No. 4,581,429 A discloses a controlled-growth radical polymerization process which uses as its initiator a compound of the formula R'R"N—O—Y, in which Y denotes a free radical species which is able to polymerize unsaturated monomers. In general, however, the reactions have low conversion rates. A particular problem is the polymerization of acrylates, which takes place only with very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific radical compounds, such as phosphorus-containing nitroxides based on imidazolidine, are used. WO 98/44008 A1 discloses specific nitroxyls based on morpholines, piperazinones and piperazinediones. DE 199 49 352 A1 describes heterocyclic alkoxyamines as regulators in controlled-growth radical polymerizations. Corresponding further developments of the alkoxyamines or of the corresponding free nitroxides improve the efficiency for the preparation of polyacrylates (Hawker, contribution to the National Meeting of The American Chemical Society, Spring 1997; Husemann, contribution to the IUPAC World Polymer Meeting 1998, Gold Coast).

As a further controlled polymerization method, atom transfer radical polymerization (ATRP) can be used advantageously to synthesize the polyacrylate PSAs, in which case use is made preferably, as initiator, of monofunctional or difunctional secondary or tertiary halides and, for abstracting the halide(s), of complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are further described in U.S. Pat. No. 5,945,491 A, U.S. Pat. No. 5,854,364 A, and U.S. Pat. No. 5,789,487 A.

Another advantageous preparation process for the polyacrylate PSAs is anionic polymerization. In this case it is preferred to use inert solvents as the reaction medium, such as aliphatic and cycloaliphatic hydrocarbons, for example, or else aromatic hydrocarbons.

In this case the living polymer is generally represented by the structure $P_L(A)$-Me, in which Me is a metal from group 1, such as lithium, sodium or potassium, and $P_L(A)$ is a growing polymer block of the monomers A. The molar mass of the polymer to be prepared is controlled by the ratio of initiator concentration to monomer concentration. Examples of suitable polymerization initiators include n-propyllithium, n-butyllithium, sec-butyllithium, 2-naphthyllithium, cyclohexyllithium, and octyllithium, with this list making no claim to completeness. Furthermore, initiators based on samarium complexes are known for the polymerization of acrylates (Macromolecules, 1995, 28, 7886) and can be used here.

Moreover, it is also possible to use difunctional initiators, such as 1,1,4,4-tetraphenyl-1,4-dilithiobutane or 1,1,4,4-tetraphenyl-1,4-dilithioisobutane. Coinitiators may likewise be used. Suitable coinitiators include lithium halides, alkali metal alkoxides or alkylaluminum compounds. In one very preferred version the ligands and coinitiators are chosen such that acrylic monomers, such as n-butyl acrylate and 2-ethylhexyl acrylate, for example, can be polymerized directly and need not be generated in the polymer by a transesterification with the corresponding alcohol.

For further development, e.g., for enhancing the pressure sensitive adhesion properties, additives may be added to the radically or anionically prepared polymers.

For instance, resins may be admixed to the polyacrylate PSAs. As tackifying resins for addition it is possible without exception to use any tackifier resins which are known and are described in the literature. As representatives, mention may be made of pinene resins, indene resins, and rosins, their disproportionated, hydrogenated, polymerized, esterified derivatives and salts, the aliphatic and aromatic hydrocarbon resins, terpene resins and terpene-phenolic resins, and also C5, C9, and other hydrocarbon resins. Any desired combinations of these and other resins may be used in order to adjust the properties of the resulting adhesive in accordance with what is desired. In general it is possible to use any resin which is compatible (soluble) with the corresponding polyacrylate; in particular, reference may be made to all aliphatic, aromatic, and alkylaromatic hydrocarbon resins, hydrocarbon resins based on pure monomers, hydrogenated hydrocarbon resins, functional hydrocarbon resins, and natural resins. Express reference is made to the depiction of the state of the art in the "Handbook of Pressure Sensitive Adhesive Technology" by Donatas Satas (van Nostrand, 1989).

Furthermore, it is also possible, optionally, to add plasticizers, fillers (e.g., fibers, carbon black, zinc oxide, titanium dioxide, chalk, solid or hollow glass beads, microbeads made of other materials, silica, silicates), nucleators, blowing agents, compounding agents and/or aging inhibitors, in the form for example of primary and secondary antioxidants or in the form of light stabilizers.

Additionally, crosslinkers and promoters for crosslinking may be admixed. Examples of suitable crosslinkers for UV crosslinking include difunctional or polyfunctional acrylates and methacrylates.

For crosslinking with UV light, free UV-absorbing photoinitiators may be added to the polyacrylate PSAs. Useful photoinitiators which are very good to use include benzoin ethers, such as benzoin methyl ether and benzoin isopropyl ether, for example, substituted acetophenones, such as 2,2-diethoxyacetophenone (available as Irgacure 651® from Ciba Geigy®), 2,2-dimethoxy-2-phenyl-1-phenylethanone, dimethoxyhydroxy-acetophenone, substituted α-ketols, such as 2-methoxy-2-hydroxypropiophenone, for example, aromatic sulfonyl chlorides, such as 2-naphthylsulfonyl chloride, for example, and photoactive oximes, such as 1-phenyl-1,2-propanedione 2-(O-ethoxycarbonyl)oxime, for example.

As well as the abovementioned photoinitiators, others can be used, including those of the Norrish I or Norrish II type.

The photoinitiators may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholine ketone, aminoketone, azobenzoin, thioxanthone, hexaarylbisimidazole, triazine, or fluorenone, it being possible for each of these radicals additionally to be substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details, it is possible to consult Carroy et al. in "Chemistry and Technology of UV and EB Formulation for Coatings, Inks and Paints", Oldring (Ed.), 1994, SITA, London.

In order to produce oriented PSAs, the polymers described above are preferably coated as hotmelt systems. In order to remove the solvent, in principle, it is possible to use any of the techniques known to the skilled worker. One very preferred technique is that of concentration using a single-screw or twin-screw extruder. The twin-screw extruder may be operated corotatingly or counterrotatingly. The solvent (organic solvent and/or water) is distilled off preferably by way of several vacuum stages. Moreover, counterheating is carried out depending on the distillation temperature of the solvent. The residual solvent fractions are preferably <1%, more preferably <0.5% and very preferably <0.2%. The hotmelt is processed further from the melt.

The coating operation itself can be carried out in different ways. Coating may take place directly onto a carrier, or alternatively onto another (temporary) surface. In the case of the latter procedure, the PSA film can then be used or processed further without a carrier or else coated onto what is ultimately the permanent carrier (by lamination, for example).

In one preferred procedure, coating is carried out directly onto a carrier material (temporary or permanent). Suitable carrier materials include, in principle, all materials known to the skilled worker to be suitable for the purpose, especially, for example, BOPP, PET, nonwoven, PVC, foam, or release papers (glassine, HDPE, LDPE).

In a preferred procedure, the orientation of the adhesive is brought about during the coating process. Alternatively, orientation may be induced after coating, in which case, in particular, it is possible to use a stretchable carrier material. When the carrier material extends, the adhesive is stretched along with it. For this case it is also possible to use acrylic PSAs coated conventionally from solution or from water.

For coating as a hotmelt, in particular with simultaneous and/or subsequent orientation of the PSA, it is possible to employ a variety of coating techniques.

In a first procedure the PSAs are coated by roll coating techniques and the orientation is produced by drawing (advantageous principle in this case: the PSA is rolled out between two or more rollers of a multiroll applicator unit and then is applied, where appropriate, to a carrier, the rollers of the multiroll applicator unit having different rotational speeds). Different roll coating techniques which can be used with advantage for the coating operation are described, for example, in the "Handbook of Pressure Sensitive Adhesive Technology" by Donatas Satas (van Nostrand, New York 1989); here, reference may be made in particular to the 3rd edition, chapter 38.

In a second procedural variant, the orientation is achieved by coating by way of a melt die, in which case it is possible to use either the contact method or the contactless method. The orientation of the PSA can be produced here, on the one hand, within the coating die, by virtue of the design of the die, or else, on the other hand, following emergence from the die, again by a drawing process. The orientation is freely adjustable to a large extent and the draw ratio can be controlled, for example, by the width of the die gap. Advantageous drawing occurs when the layer thickness of the PSA film on the substrate to be coated is less than the width of the die gap.

In another preferred process, the orientation is achieved by extrusion coating. Extrusion coating is advantageously performed using an extrusion die. The extrusion dies used may be chosen preferably as a T-die, fishtail die or coathanger die; the individual types differ in the design of their flow channel. Additionally, here, in analogy to melt die coating, it is likewise possible to obtain an orientation following emergence from the die, by drawing of the PSA film.

In order to produce oriented acrylic PSAs it is preferred to carry out coating onto a carrier using a coathanger die, specifically in such a way that a polymer layer is formed on the carrier by means of a movement of the die relative to the carrier. Subsequent reinforcement of the orientation by means of a drawing operation is optional.

The extent of the orientation within the acrylic PSAs is further influenced by the process parameters of the coating operation. For instance, the orientation can be influenced, for example, by the die temperature and coating temperature, by the temperature of the substrate to be coated, and also by the molecular weight of the polyacrylate PSA used.

As already mentioned, the ratio of the width of the die gap to the thickness of the PSA film is also relevant for the degree of orientation; in this context, the degree of orientation is freely adjustable by means of the die gap width. The thicker the PSA film expressed from the coating die, the greater the extent to which the adhesive can be drawn to a relatively thin PSA film on application to the substrate that is to be coated (a carrier material, for example). This drawing operation may be varied freely not only through the choice of the width of the die gap but also through the web speed of the substrate to be coated.

The best orientation effects are obtained by deposition onto a cold surface. Consequently, the surface to be coated should be cooled directly; a carrier material to be coated, for example, can be cooled by means of a (chill) roll during coating. The cooling of the roll can be accomplished by means of a film of a contact medium (for example, a liquid) from the outside (e.g., by spraying with water) or from the inside (internally cooled roll) or by means of a cooling gas. The cooling gas may likewise be used to cool the PSA emerging from the coating die.

Advantageously, the oriented PSA is coated directly or indirectly onto a roller provided with a contact medium (directly: direct application; indirectly: a carrier material is additionally located, for example, between the roller provided with the contact medium, and the PSA film). As a result of the contact medium, it is possible to effect very rapid cooling of the PSA.

For this purpose the roller is preferably wetted with the contact medium, which is then located between the roller and the carrier material or the PSA.

The roller is preferably cooled to not more than room temperature, very preferably to temperatures below 10° C. The roller ought to be rotated.

As the contact medium it is preferred to use a material which has the capacity to bring about contact between the PSA film (in the case of direct application) or the carrier material (particularly in the case of indirect application) and the surface of the roller. A material particularly suitable for this purpose is one which fills the cavities between the PSA film or carrier material and the roller surface (for example, unevennesses in the roller surface, bubbles).

Appropriate materials for this purpose are flowable materials, which may be present in a wide viscosity range. For example, the contact medium may be composed of a pressure sensitive adhesive or of another material which flows onto the roller or carrier material and so displaces the air.

In addition it is possible to use soft, "conforming" materials as the contact medium. For example, flexible materials can be used, such as plasticized rubber, plasticized PVC, other plasticized plastics, and similar materials, for example.

Examples of appropriate additives to water as the contact medium include alkyl alcohols such as ethanol, propanol, butanol, and hexanol, without wishing to be restricted in the selection of the alcohols as a result of these examples. Also especially advantageous are longer-chain alcohols, polyglycols, ketones, amines, carboxylates, sulfonates, and the like. Many of these compounds lower the surface tension or raise the conductivity.

A lowering in the surface tension may also be achieved by adding small amounts of nonionic and/or anionic and/or cationic surfactants to the contact medium. The most simple way of achieving this is by using commercial washing compositions or soap solutions, preferably in a concentration of a few g/l in water as the contact medium. Particularly suitable compounds are special surfactants which can be used even at low concentrations. Examples thereof include sulfonium surfactants (e.g., β-di(hydroxyalkyl)sulfonium salt), and also, for example, ethoxylated nonylphenylsulfonic acid ammonium salts or block copolymers, especially diblocks. Here, reference may be made in particular to the state of the art under "surfactants" in Ullmann's Encyclopedia of Industrial Chemistry, Sixth Edition, 2000 Electronic Release, Wiley-VCH, Weinheim 2000.

As contact media it is possible to use the abovementioned liquids, even without the addition of water, in each case alone or in combination with one another.

In order to improve the properties of the contact medium (for example for increasing the shearing resistance, reducing the transfer of surfactants or the like to the surface of the liner, and thus improved cleaning possibilities of the end product), salts, gels, and similar viscosity-increasing additives may also be added with advantage to the contact medium and/or to the adjuvants used.

Moreover, the roller can be macroscopically smooth or may have a surface with a low level of structuring. It has been found appropriate for the roller to possess a surface structure, especially a surface roughening. This allows wetting by the contact medium to be improved.

The process proceeds to particularly good effect if the roller is temperature-controllable, preferably within a range from −30° C. to 200° C., with very particular preference from 5° C. to 25° C.

The contact medium is preferably applied to the roller, although it is also possible to carry out contactless application, by spraying, for example.

In order to prevent corrosion, the roller is commonly coated with a protective coat. This coat is preferably selected such that it is wetted effectively by the contact medium. In general, the surface is conductive. It may also be more favorable, however, to coat it with one or more coats of insulating or semiconducting material.

Where a liquid is used as the contact medium, one outstanding procedure is to run a second roller, advantageously having a wettable or absorbent surface, through a bath containing the contact medium, said roller then becoming wetted by or impregnated with the contact medium and applying a film of said contact medium by contact with the roller.

After the PSA has been applied by coating and after the orientation has developed, it is advantageous to crosslink the PSA using actinic radiation. Advantageously, the time between coating and crosslinking is short. Crosslinking takes place advantageously less than 60 minutes after coating or after the orientation has been set, preferably after less than 3 minutes, very preferably in an in-line process after less than 5 seconds. The cooling operation after coating results in the immediate development of a microphase-separated system, which maintains the degree of orientation of the PSAs.

In preferred embodiments of the invention, crosslinking takes place with UV radiation or with electron beams. Depending on the technique used, crosslinking takes place on the carrier material of the PSA tape or on the roller provided with the contact medium. In one preferred procedure, the crosslinking operation or part of the crosslinking operation takes place in the region of the above-described roller provided with the contact medium; in this case, the oriented PSA is advantageously transferred subsequently to a carrier material.

UV crosslinking is preferably effected by brief ultraviolet irradiation in a wavelength range from 200 to 400 nm, depending on the UV photoinitiator used, especially using high or medium pressure mercury lamps with an output of from 80 to 240 W/cm. The intensity of irradiation is adapted to the respective quantum yield of the UV photoinitiator.

A further option is to crosslink the PSA using electron beams. Typical irradiation equipment which may be used includes linear cathode systems, scanner systems, and segmented cathode systems, where electron beam accelerators are involved. A detailed description of the state of the art and the most important process parameters can be found in Skelhorne, Electron Beam Processing, in Chemistry and Technology of UV and EB formulation for Coatings, Inks and Paints, vol. 1, 1991, SITA, London. The typical acceleration voltages are situated in the range between 50 kV and 500 kV, preferably between 80 kV and 300 kV. The radiation doses employed range between 5 and 150 kGy, in particular between 20 and 100 kGy.

The pressure sensitive adhesives obtained in accordance with the inventive use can be employed outstandingly as pressure sensitive adhesives for single-sided or double-sided pressure sensitive adhesive tapes.

Experiments

The process of the invention is described below by means of exemplary experiments.

The following test methods have been employed in order to evaluate the technical adhesive properties of the PSAs prepared.

Test Methods

180° Bond Strength Test (Test A)

A strip, 20 mm wide, of an acrylic pressure sensitive adhesive coated onto a polyester carrier or siliconized release paper was applied to steel plates which had been washed twice with acetone and once with isopropanol. Depending on direction and drawing, longitudinal or transverse specimens were bonded to the steel plate. The PSA strip was pressed onto the substrate twice using a 2 kg weight. The adhesive tape was then immediately peeled from the substrate at an angle of 180° and at 30 mm/min.

The results are reported in N/cm and are averaged from three measurements. All measurements were conducted at room temperature under controlled-climate conditions.

Measurement of the Birefringence (Test B)

Version 1

Two crossed polaroid filters were placed in the sample beam of a Uvikon 910 spectrophotometer. Oriented acrylates were fixed between two slides. The layer thickness of the oriented sample was determined from preliminary experiments by means of thickness gauges. The sample thus prepared was placed in the measuring beam of the spectrophotometer with its direction of orientation deviating in each case by 45° from the optical axes of the two polaroid filters. The transmission, T, was then monitored over time by means of a time-resolved measurement. The transmission data were then used to determine the birefringence in accordance with the relationship below.

Version 2

The birefringence was measured with an experimental setup such as described analogously in the Encyclopedia of Polymer Science, John Wiley & Sons, vol. 10, p. 505, 1987 as a circular polariscope. The light emitted by a diode-pumped solid-state laser of wavelength $\lambda=532$ nm is first of all linearly polarized by a polaroid filter and then circularly polarized using a $\lambda/4$ plate with $\lambda=532$ nm. The laser beam thus polarized is then passed through the oriented acrylate composition. Since acrylate compositions are highly transparent, the laser beam is able to pass through the composition virtually unhindered. Where the polymer molecules of the acrylate composition are oriented, this results in a change in the polarizability of the acrylate composition depending on observation angle (birefringence). As a result of this effect, the E vector of the circularly polarized laser beam undergoes a rotation about the axis of progression of the laser beam. After departing the sample, the laser beam thus manipulated is passed through a second $\lambda/4$ plate with $\lambda=532$ nm whose optical axis deviates by 90° from the optical axis of the first $\lambda/4$ plate. This filter is followed by a second polaroid filter which likewise deviates by 90° from the first polaroid filter. Finally, the intensity of the laser beam is measured using a photosensor, and An is determined in accordance with the relationships below.

Conversion

The transmission T is calculated using: $T=\sin^2(\pi \times R)$.

The retardation R is made up as follows:

$$R = \frac{d}{\lambda} \Delta n.$$

The transmission is also made up of $$T = \frac{I_t}{I_0}.$$

This ultimately provides for the birefringence:

$$\Delta n = \frac{\lambda}{\pi d}\arcsin\sqrt{T}.$$

In these formulae
I_r=intensity measured
I_0=intensity irradiated
T=transmission
d=sample thickness
λ=wavelength
Δn=birefringence
R=retardation Determination of the Gel Fraction (Test C)

After careful drying, the solvent-free adhesive samples are welded into a pouch made of polyethylene nonwoven (Tyvek nonwoven). The gel index is determined from the difference in the sample weights before and after extraction with toluene, as the percentage weight fraction of the polymer that is not soluble in toluene.

Measurement of the Shrinkback (Test D)

Coating: The PSAs under investigation are coated at a rate of 50 g/m², without a carrier or onto a temporary carrier. A particular procedure in this case is that described later on below (sections on Coating, UV crosslinking).

Processing: The PSAs are processed without carriers; any temporary carrier present is removed prior to processing.

In parallel with the coating direction of the hotmelt, strips with a width of at least 30 mm and a length of at least 20 cm are cut. In the case of application rates of 50 g/M², 8 strips are laminated onto one another in order to obtain comparable layer thicknesses. The specimen obtained in this way is then cut to a width of exactly 20 mm and is overstuck at each end with strips of paper, so that the region of 'free' adhesive remaining between the overstuck ends of the strip is 15 cm long.

Measurement: The test specimen prepared in this way is suspended vertically at RT and the change in length over time is monitored until no shrinkage of the sample can be ascertained more. The initial length, reduced by the final value, is then reported, relative to the initial length, as the shrinkback, in percent.

Gel Permeation Chromatography GPC (Test E)

The average molecular weights $M_n$ and $M_w$ and the polydispersity PD were determined by gel permeation chromatography. The eluent used was THF containing 0.1% by volume trifluoroacetic acid. Measurement was made at 25° C. The precolumn used was PSS-SDV, 5 μ, $10^3$ Å, ID 8.0 mm×50 mm. Separation was carried out using the columns PSS-SDV, 5 μ, $10^3$ and also $10^5$ and $10^6$ each with ID 8.0 mm×300 mm. The sample concentration was 4 g/l, the flow rate 1.0 ml per minute. Measurement was made against PMMA standards.

DSC

Glass transition temperatures are reported as results from quasistatic methods such as, for example, Differential Scanning Calorimetry (DSC), constant heating rate 10° C. in 5 min, inert gas atmosphere.

Raw Materials:

The macromonomer (B) used was 2-polystyreneethyl methacrylate (Chemlink® 4500 Macromer™ from Sartomer). The molecular weight of the monomer is 13 000 g/mol; the macromonomer is prepared by anionic polymerization. The refractive index is 1.59–1.60.

VAZO 52® is 2,2'-azobis(2,4-dimethylpentanonitrile).

EXAMPLE 1

A 10 L reactor conventional for radical polymerizations was charged with 60 g of acrylic acid, 1.62 kg of 2-ethylhexyl acrylate, 200 g of Chemlink® 4500 Macromer™, 120 g of N-isopropylacrylamide and 500 g of ethyl acetate. After nitrogen gas had been passed through the reactor for 45 minutes with stirring, the reactor was heated to 70° C. and 0.6 g of 2,2'-azoisobutyronitrile (AIBN) in solution in 30 g of ethyl acetate was added. The external heating bath was then heated to 70° C. and the reaction was carried out constantly at this external temperature. After a reaction time of 60 minutes, 0.2 g of Vazo 52® from DuPont in solution in 10 g of ethyl acetate was added. After a reaction time of 90 minutes, a further 0.2 g of Vazo 52® from DuPont in solution in 10 g of ethyl acetate was added, and, after a reaction time of 2 hours, 0.4 g of Vazo 52® from DuPont in solution in 200 g of ethyl acetate was added. After 3 hours, 1.2 g of 2,2'-azoisobutyronitrile (AIBN) in solution in 30 g of ethyl acetate were added. After 5 hours, the reaction mixture was diluted with 400 g of ethyl acetate. After periods of 5, 6, and 7 hours, portions each of 2 g of dicyclohexyl dioxypercarbonate (Perkadox 16®, from Akzo Nobel) in solution in each case in 50 g of ethyl acetate were added. After a reaction time of 36 hours, the reaction was terminated by cooling to room temperature. After cooling, 10 g of isopropylthioxanthone (Speedcure ITX®, from Rahn) were added and completely dissolved.

EXAMPLE 2

A 10 L reactor conventional for radical polymerizations was charged with 120 g of acrylic acid, 1.68 kg of 2-ethylhexyl acrylate, 200 g of Chemlink® 4500 Macromer™ and 500 g of ethyl acetate. After nitrogen gas had been passed through the reactor for 45 minutes with stirring, the reactor was heated to 70° C. and 0.6 g of 2,2'-azoisobutyronitrile (AIBN) in solution in 30 g of ethyl acetate was added. The external heating bath was then heated to 70° C. and the reaction was carried out constantly at this external temperature. After a reaction time of 60 minutes, 0.2 g of Vazo 52® from DuPont in solution in 10 g of ethyl acetate was added. After a reaction time of 2 hours, 0.4 g of Vazo 52® from DuPont in solution in 200 g of ethyl acetate was added. After 3 hours, 1.2 g of 2,2'-azoisobutyronitrile (AIBN) in solution in 30 g of ethyl acetate were added. After 5 hours, the reaction mixture was diluted with 400 g of ethyl acetate. After periods of 5, 6, and 7 hours, portions each of 2 g of dicyclohexyl dioxypercarbonate (Perkadox 16®, from Akzo Nobel) in solution in each case in 50 g of ethyl acetate were added. After a reaction time of 36 hours, the reaction was terminated by cooling to room temperature.

EXAMPLE 3

A 10 L reactor conventional for radical polymerizations was charged with 30 g of acrylic acid, 1.77 kg of 2-ethylhexyl acrylate, 200 g of Chemlink® 4500 Macromer™ and 500 g of ethyl acetate. After nitrogen gas had been passed through the reactor for 45 minutes with stirring, the reactor was heated to 70° C. and 0.6 g of 2,2'-azoisobutyronitrile (AIBN) in solution in 30 g of ethyl acetate was added. The external heating bath was then heated to 70° C. and the reaction was carried out constantly at this external temperature. After a reaction time of 60 minutes, 0.2 g of Vazo 52® from DuPont in solution in 10 g of ethyl acetate was added. After a reaction time of 2 hours, 0.4 g of Vazo 52® from DuPont in solution in 200 g of ethyl acetate was added. After 3 hours, 1.2 g of 2,2'-azoisobutyronitrile (AIBN) in solution in 30 g of ethyl acetate were added. After 5 hours, the reaction mixture was diluted with 400 g of ethyl acetate. After periods of 5, 6, and 7 hours, portions each of 2 g of dicyclohexyl dioxypercarbonate (Perkadox 16®, from Akzo Nobel) in solution in each case in 50 g of ethyl acetate were added. After a reaction time of 36 hours, the reaction was terminated by cooling to room temperature.

EXAMPLE 4

The polymer from example 3 was blended in solution with 30% by weight of a C5–C9 hydrocarbon resin (TK 90®, from VFT Rüttgers, softening range 88–90° C.) and with 1% by weight of SR 610® (from Cray Valley, polyethylene glycol diacrylate).

EXAMPLE 5

A 10 L reactor conventional for radical polymerizations was charged with 30 g of acrylic acid, 1.67 kg of 2-ethylhexyl acrylate, 300 g of Chemlink® 4500 Macromer™ and 500 g of ethyl acetate. After nitrogen gas had been passed through the reactor for 45 minutes with stirring, the reactor was heated to 70° C. and 0.6 g of 2,2'-azoisobutyronitrile (AIBN) in solution in 30 g of ethyl acetate was added. The external heating bath was then heated to 70° C. and the reaction was carried out constantly at this external temperature. After a reaction time of 60 minutes, 0.2 g of Vazo 52® from DuPont in solution in 10 g of ethyl acetate was added. After a reaction time of 2 hours, 0.4 g of Vazo 52® from DuPont in solution in 200 g of ethyl acetate was added. After 3 hours, 1.2 g of 2,2'-azoisobutyronitrile (AIBN) in solution in 30 g of ethyl acetate were added. After 5 hours, the reaction mixture was diluted with 400 g of ethyl acetate. After periods of 5, 6, and 7 hours, portions each of 2 g of dicyclohexyl dioxypercarbonate (Perkadox 16®, from Akzo Nobel) in solution in each case in 50 g of ethyl acetate were added. After a reaction time of 36 hours, the reaction was terminated by cooling to room temperature.

Coating

The examples described were freed from the solvent in a vacuum drying cabinet. A vacuum of 10 Torr was applied and the temperature was slowly raised to 100° C. The hotmelt PSA was then coated (i.e. applied) using a Pröls melt die. The coating temperature was 160° C. Coating took place at 20 m/min onto a siliconized released paper (from Laufenberg). The die gap width was 200 µm. After coating, the application rate of the adhesive on the release paper was 50 g/m². For coating, a pressure of 6 bar was applied to the melt die to allow the hotmelt PSA to be pressed through the die.

UV Crosslinking

Unless described otherwise, UV crosslinking was carried out at room temperature 5 minutes after coating, using a UV crosslinking unit from Eltosch. The UV emitter used was a medium pressure mercury emitter having an intensity of 120 W/cm². The belt speed was 20 m/min; crosslinking was carried out with full radiation.

To vary the UV irradiation dose, the samples were irradiated with a different number of irradiation passes; the UV dose increases linearly with the number of passes. The UV doses were determined using the Power-Puck® from Eltosch. For example, for 2 passes, a UV dose of 0.8 J/cm² was measured, for 4 passes a dose of 1.6 J/cm², for 8 passes a dose of 3.1 J/cm², and for 10 passes a dose of 3.8 J/cm².

Electron Beam Irradiation

Electron beam irradiation took place using an instrument from the company Electron Crosslinking AB, Halmstad, Sweden. The release paper for irradiation was guided over a thermal conditioning roller (a standard feature) under the Lenard window of the accelerator. In the zone of irradiation, the atmospheric oxygen was displaced by flushing with pure nitrogen. The belt speed was 10 m/min in each case. All experiments were carried out using an acceleration voltage of 180 kV.

Results

In order to investigate the orientation of acrylic PSAs and their crosslinkability, first of all a variety of acrylic PSAs were prepared by free-radical polymerization. In terms of temperature stability and flow viscosity, all of the adhesives can be processed in a hotmelt operation. The acrylic PSAs prepared were polymerized in different solvent mixtures. To determine the polymer properties, Test E was carried out first after the polymerization. The results are summarized in Table 1.

TABLE 1

Molecular weights of the polymers in g/mol by Test E

|  | $M_n$ | $M_w$ |
| --- | --- | --- |
| Example 1 | 212 000 | 970 000 |
| Example 2 | 199 000 | 903 000 |
| Example 3 | 202 000 | 946 000 |
| Example 5 | 243 000 | 1 045 000 |

Example 4 is not given in Table 1, since in this experiment/example modification was carried out with a resin.

After the polymerization, examples 1 to 5 were freed from the solvent and processed further from the melt. Coating was carried out through a melt die at 160° C. onto a release paper which was left at room temperature. After 15 minutes, crosslinking was carried out with UV radiation (Example 1) or with electron beams (Examples 2 to 5).

In order to determine the anisotropic properties, first of all, the shrinkback in the free film was measured by Test D. To determine the degree of crosslinking, Test C was carried out, and hence the gel fraction was determined. The gel fraction indicates the percentage amount of the crosslinked polymer. The constancy of the shrinkback and hence of the orientation was determined in accordance with Test E. The results are summarized in Table 2.

TABLE 2

| Example | Number of UV passes | EB crosslinking dose in kGy | Shrinkback, immediate (Test D) | Shrinkback after 3 months (Test D) | Gel index in % by Test C |
| --- | --- | --- | --- | --- | --- |
| 1 | 6 | — | 40% | 37% | 64 |
| 2 | — | 30 | 61% | 59% | 55 |
| 3 | — | 30 | 62% | 58% | 57 |
| 4 | — | 60 | 56% | 54% | 32 |
| 5 | — | 30 | 64% | 61% | 59 |

From Table 2 it is apparent that all of the examples, irrespective of the nature of the crosslinking or addition of resin, possess a shrinkback. Furthermore, the results from Test D and Test E demonstrate that the shrinkback is retained over a very long period of time. In all cases the deviation was less than 10%.

In order to confirm that examples 1 to 5 prepared are pressure sensitive adhesives, the adhesion properties were determined by means of Test A. The results are listed in Table 3.

TABLE 3

|  | BS in N/cm by Test A |
|---|---|
| Example 1 | 3.8 |
| Example 2 | 4.2 |
| Example 3 | 4.0 |
| Example 4 | 6.7 |
| Example 5 | 4.0 |

BS = instantaneous bond strength on steel

We claim:

1. A method for the preparation of oriented polyacrylate pressure sensitive adhesives comprising the polymerization of a monomer mixture, wherein said monomer mixture comprises macromonomers which have
   a glass transition temperature of at least 20° C.,
   at least one oligomeric and/or polymeric structural unit which is incompatible with polyacrylates, and
   at least one polymerizable double bond in the form of a vinyl, acrylate and/or methacrylate unit
and said polymerized monomer mixture is applied as a coating to a carrier and oriented during or after said application.

2. The method as claimed in claim 1, wherein the oligomeric or polymeric structural unit is inert to a radical polymerization.

3. The method as claimed in claim 1, wherein the oligomeric or polymeric structural unit is inert to an anionic polymerization.

4. The method as claimed in claim 1, wherein the oriented polyacrylate pressure sensitive adhesives have a preferential direction such that the refractive index measured in the preferential direction, $n_{MD}$, is greater than the refractive index measured in a direction perpendicular to the preferential direction, $n_{CD}$, with the difference $\Delta n = n_{MD} - n_{CD}$ being at least $1 \cdot 10^{-6}$.

5. The method of claim 1, wherein the oriented pressure sensitive adhesives immediately after their preparation exhibit a shrinkback of at least 3% in the free film, determined in accordance with test D.

6. The method of claim 1, wherein, 3 months after their preparation, with storage at 23° C. and 50% relative humidity during that time, the oriented pressure sensitive adhesives exhibit a shrinkback of at least 3% in the free film, determined in accordance with Test D.

7. The method of claim 1, wherein the fraction of the macromonomers in the polymerization mixture is up to 40% by weight.

8. The method of claim 7, wherein said fraction is up to 30% by weight.

9. The method of claim 1, wherein, said macromonomers are acrylate- and/or methacrylate-functionalized polystyrenes and/or poly-α-methylstyrenes of the formula:

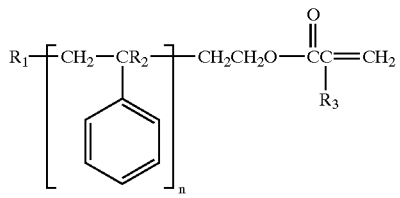

in which, independently of one another,
   $R_1$ = a radical which is a residue of a polymerization initiator,
   $R_2$ = H or $CH_3$
   $R_3$ = H or $CH_3$
   n = 20 to 350.

10. The method of claim 9, wherein said radical is an optionally branched alkyl radical.

11. The method of claim 10, wherein said radical is $CH_3CH_2C(CH_3)H$.

12. The method of claim 9, wherein n=45 to 250.

* * * * *

UNITED STATES PATENT AND TRADEMARK OFFICE
CERTIFICATE OF CORRECTION

PATENT NO. : 6,991,828 B2  Page 1 of 1
APPLICATION NO. : 10/430150
DATED : January 31, 2006
INVENTOR(S) : Husemann et al.

It is certified that error appears in the above-identified patent and that said Letters Patent is hereby corrected as shown below:

Column 16, Line 49, "and An" should read -- and $\Delta n$ --

Column 22, Line 37, "n=20to 350." should read -- n=20 to 350. --

Signed and Sealed this

First Day of April, 2008

JON W. DUDAS
*Director of the United States Patent and Trademark Office*